(12) United States Patent
Yang et al.

(10) Patent No.: US 6,611,439 B1
(45) Date of Patent: Aug. 26, 2003

(54) PWM CONTROLLER FOR CONTROLLING OUTPUT POWER LIMIT OF A POWER SUPPLY

(75) Inventors: Ta-yung Yang, Taipei (TW); Jenn-yu G. Lin, Taipei (TW); Shu-chung Yi, Taipei (TW)

(73) Assignee: System General Corporation, CA (US)

( * ) Notice: Subject to any disclaimer, the term of this patent is extended or adjusted under 35 U.S.C. 154(b) by 0 days.

(21) Appl. No.: 10/065,530

(22) Filed: Oct. 28, 2002

(51) Int. Cl.[7] .............................................. H02M 3/335
(52) U.S. Cl. ......................................... 363/41; 363/97
(58) Field of Search ............................. 363/20, 21.01, 363/21.1, 21.18, 40, 41, 95, 97, 131, 49

(56) References Cited

U.S. PATENT DOCUMENTS

| 4,240,134 | A | * | 12/1980 | Nakazawa et al. ....... 363/21.05 |
|---|---|---|---|---|
| 5,469,349 | A | * | 11/1995 | Marinus ................... 363/21.08 |
| 5,498,995 | A | * | 3/1996 | Szepesi et al. ............... 327/538 |
| 6,208,538 | B1 | | 3/2001 | Halamik et al. .............. 363/41 |
| 6,381,154 | B1 | | 4/2002 | Nguyen ........................ 363/41 |
| 6,469,914 | B1 | * | 10/2002 | Hwang et al. ........... 363/21.01 |
| 6,469,917 | B1 | * | 10/2002 | Ben-Yaakov ................. 363/44 |

* cited by examiner

Primary Examiner—Adolf D. Berhane
(74) Attorney, Agent, or Firm—Jiang Chyun IP Office

(57) ABSTRACT

A PWM controller has a line voltage input that allows using an input resistor for both start-up and power-limit compensation, thus saving the power consumption, easing the PCB layout, and shrinking the power supply size. In the integrated circuit, a mirrored-resistor used for the power limit compensation is composed of a mirror MOSFET, which is associated with an op amplifier, a constant voltage and a constant current to provide a precise resistance. Thus, by properly selecting the value of the input resistor, an identical output power limit for low line and high line voltage input can be achieved.

3 Claims, 3 Drawing Sheets

PWM CONTROLLER FOR CONTROLLING OUTPUT POWER LIMIT OF A POWER SUPPLY

BACKGROUND OF INVENTION

1. Field of the Invention

The present invention relates to a power supply. More particularly, the present invention relates to the pulse width modulation (PWM) of a switching mode power converter.

2. Background of the Invention

The PWM is a traditional technology used in the switching mode power converter to control the output power and achieve the regulation. Various protection functions, such as over-voltage and over-current protection are built-in in the power supply to protect the power supply and the connected circuits from permanent damage. The function of output power limit is generally used for the over-load and short circuit protection. Referring to FIG. 1, a traditional PWM power supply circuit using the PWM controller 100, such as the PWM-control integrated circuit 3842, which has been widely used for the power supply, is illustrated. The operation of PWM-control starts on the charging of a capacitor 290 via a serial start-up resistor 222 when the power is turned on until the VCC reaches the threshold voltage, and then a PWM controller 100 starts to output a PWM signal and drive the entire power supply. After the start-up, the supply voltage VCC is provided from the auxiliary bias winding of the transformer 400 through a rectifier 330. The resistor 230 that is connected serially with the power MOSFET 300 determines the maximum output power of the power supply. The method is to connect the voltage of resistor 230 to the current-sense input (VS) of the PWM controller 100. If the voltage VS is greater than the maximum current-sense voltage such as 1V, the PWM controller 100 will disable the output of its OUT pin, and restrict the maximum power output of the power supply. The energy stored in an inductor is given by $$\varepsilon = \frac{1}{2} \times L \times I^2 = P \times T$$

The maximum output power P can be expressed as follows:

$$I_P = \frac{V_{IN}}{L_P} \times t_{ON} \quad (1)$$

$$P = \frac{L_P}{2 \times T} \times I_P^2 = \frac{V_{IN}^2 \times t_{ON}^2}{2 \times L_P \times T} \quad (2)$$

Ip and Lp are the primary current and the primary inductance of the transformer 400, respectively, $t_{ON}$ is the turn-on time of the PWM signal in which the power MOSFET 300 is switched on, and T is the PWM switching period. From the equation (2), we found that the output power will vary as the input voltage varies. When the safety regulations are taken into consideration, the range of the input voltage is from 90Vac to 264Vac, wherein the output power limit of the power supply in high line voltage is many times higher than the output power limit in low line voltage. Although the output voltage (power) will be kept constant by automatically adjusting the $t_{ON}$ through the feedback control loop of the power supply, the maximum $t_{ON}$ is restricted when the the voltage in the VS pin is higher than an upper limit voltage, such as $VS \geq 1V (Ip \times Rs \geq 1V$, where Rs is the resistor 230). Furthermore, the maximum output power is also affected by the PWM controller's response time $t_D$. From the moment that the voltage in the VS pin is higher than the upper limit voltage (Ip×Rs≧1V) to the moment that the PWM controller 100's OUT pin is actually turned off, there is a delay time $t_D$. Within this delay time $t_D$, the power MOSFET is still on, and it will continue delivering power. Therefore, the actual turn-on time of the PWM signal is equal to $t_{ON}+t_D$, and the actual output power becomes as follows:

$$P = \frac{V_{IN}^2 \times (t_{ON} + t_D)^2}{2 \times L_P \times T} \quad (3)$$

Although the $t_D$ time is short, generally within the range of 250~300 ns, the higher the operating frequency is, the more impact is caused by $t_D$ because the switching period T is short and $t_D$ becomes relatively more important. The input voltage VIN should be compensated properly, such that the input voltage will not affect the maximum output power. Referring to FIG. 1, a bias resistor 220 is added between VIN and the VS pin for compensation. The function of the bias resistor 220 can compensate the difference of the output power caused by the input voltage VIN and the delay time $t_D$. By properly selecting the value of the bias resistor 220, an identical output power limit for the low line and high line voltage inputs can be obtained The bias resistor 220 causes significant power consumption, especially in high line voltage input, it can be shown as follows:

$$P_R = \frac{V_{IN}^2}{R} \quad (4)$$

Besides, a high voltage across the resistor 220 causes inconvenience for the component selection and PCB layout.

SUMMARY OF INVENTION

The invention provides a PWM controller having a line voltage input that allows using one resistor for the functions of start-up resistor and bias resistor. The PWM controller comprises a current divider, a mirror-R, an adder and a reference voltage to start up the power supply and compensate the output power limit.

An input resistor is connected from the input voltage to the current divider to provide an input current for the PWM controller, wherein the variation of the input current is directly proportional to the change of the input voltage. The current divider includes two MOSFET's. A first MOSFET transparently drives the input current to charge up the start-up capacitor. Once the voltage in the start-up capacitor reaches the threshold voltage, the PWM controller starts to operate. A second MOSFET proportionally mirrors a mirror current from the first MOSFET in accordance with the geometric size of the first MOSFET and the second MOSFET. The mirror current flows into the mirror-R to generate an offset voltage. Through the adder, the reference voltage subtracts the offset voltage and produces a programmable maximum current-sense voltage for the output power limit. Because the offset voltage is a function of the input voltage, the variation of the maximum current-sense voltage is inversely proportional to the deviation of the input voltage, and by selecting a proper input resistor an identical output power limit can be achieved for low line and high line voltage input.

In addition, the behavior of the mirror-R is a resistance, however it is difficult to design a precise resistor inside the integrated circuit. Thus producing a resistor with a precise absolute value in the integrated circuit is invented. The mirror-R comprises a constant voltage, a constant current, an operation amplifier (op amplifier), and two MOSFETs associated with two resistors to generate a precise mirror-R. The constant current flows into the drain of the first MOSFET, while the gate of the first MOSFET is driven by the op amplifier to make its drain voltage equal to the constant voltage. The second MOSFET is cross-coupled with the first MOSFET to mirror the resistance of the first MOSFET for the output. Two resistors are connected from the source of two MOSFETs to the ground respectively to expand the linear resistance region of the MOSFETs.

Advantageously, the PWM controller having a line voltage input for output power limit of the present invention can provide functions for starting up the power supply and compensating the output power limit. Furthermore, only one resistor is applied, which saves the power consumption, eases the PCB layout, and shrinks the size of power supply.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention together with the description, which serve to explain the principles of the invention.

DETAILED DESCRIPTION

Figure 1:
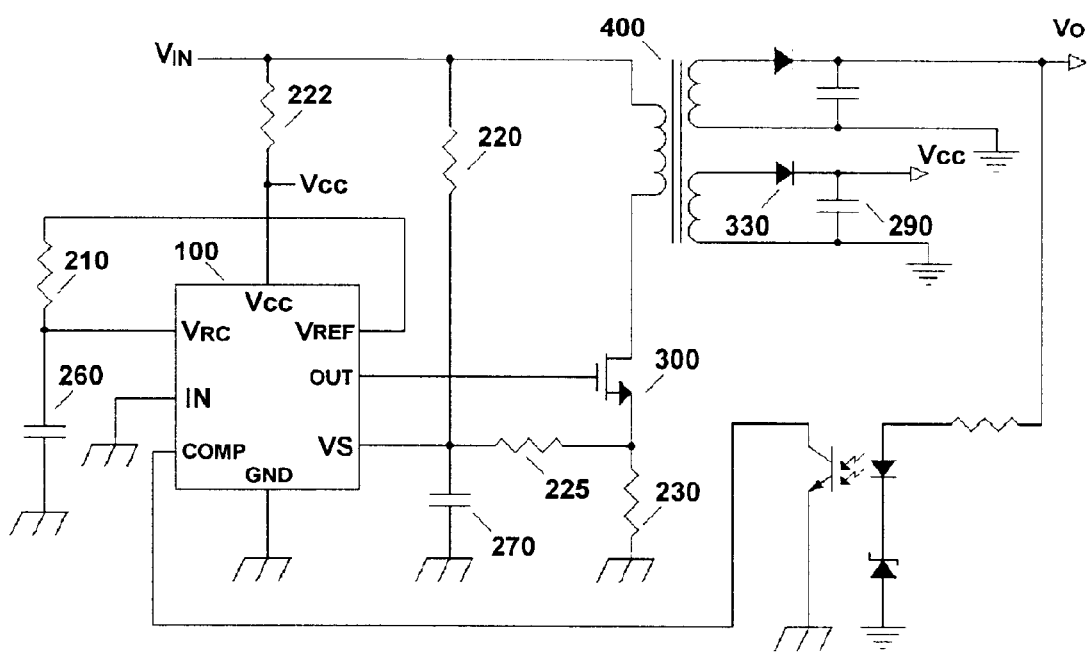
FIG. 1 illustrates a conventional application circuit for the PWM power supply.
Figure 2:
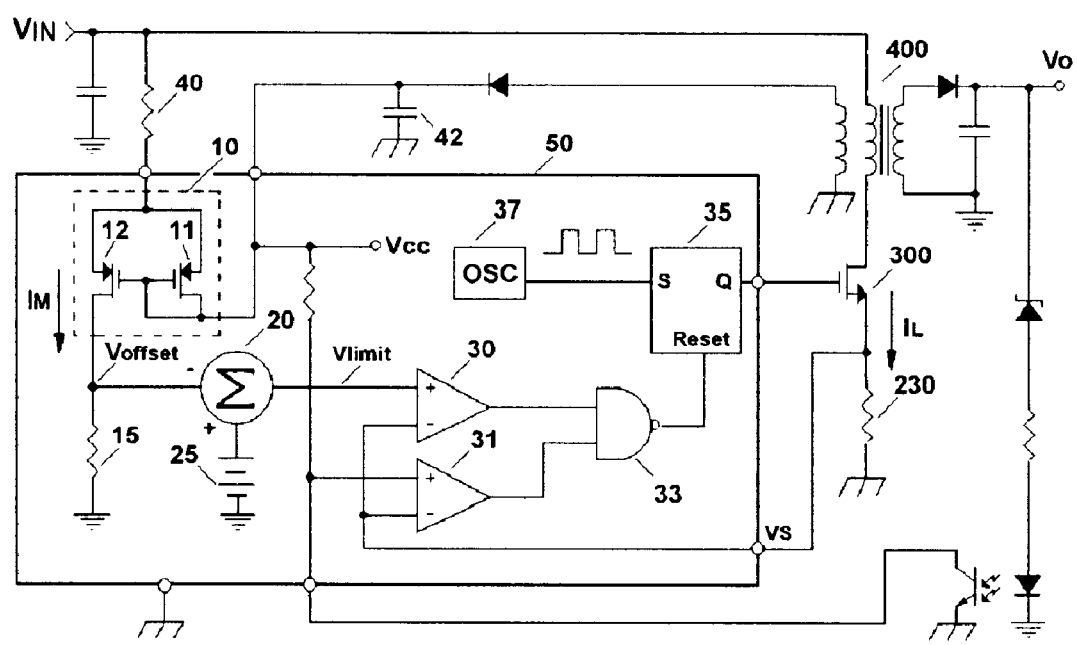
FIG. 2 shows the block diagram of the PWM controller of a preferred embodiment of the present invention and connected circuits therewith.

FIG. 2 schematically shows the block diagram of the PWM controller according to the present invention. The PWM controller 50 comprises a current divider 10 composed of a MOSFET 11 and a MOSFET 12, a resistor 15, a reference voltage 25, an adder 20, a first comparator 30, a second comparator 31, a NAND gate 33, a flip-flop 35 and an oscillator 37, which serves to provide an input signal for the flip-flop 35. The source of the MOSFET 11 and the source of the MOSFET 12 are connected together to form an input of the current divider 10. An input resistor 40 is connected between the input voltage VIN and the input of the current divider 10. The gate and drain of the MOSFET 11 and the gate of the MOSFET 12 are connected together to the supply voltage VCC. The resistor 15 with precise absolute value is connected between the drain of the MOSFET 12 and the ground. The drain of the MOSFET 12 is connected to the negative input terminal of the adder 20. The reference voltage 25 is connected to the positive input terminal of the adder 20. The output of the adder 20 is a maximum current-sense voltage, which is connected to the positive input terminal of the first comparator 30. The negative input terminal of the first comparator 30 and second comparator 31 are connected together to the source of a power MOSFET 300. The current IL flowing through a resistor 230 produces a sense voltage VS in the resistor 230.

Once the power supply is turned on, the input current flows into the current divider 10 consisting of MOSFET 11 and MOSFET 12 through the input resistor 40. Most of the input current flows through the MOSFET 11 and starts to charge up the start-up capacitor 42. When the voltage in the capacitor 42 reaches the threshold voltage, the PWM controller starts to operate and output a PWM signal. And after that, the supply voltage VCC will be provided from the auxiliary winding of a transformer 400. If the MOSFET 11 is geometrically in proportion to the MOSFET 12, the currents that flow through the MOSFET 11 and the MOSFET 12 will be proportional to each other as well. In other words, the MOSFET 12 will mirror a proportional mirror current flowing from the MOSFET 11. This mirror current will vary proportionately to the line input voltage VIN. When this mirror current flows through the resistor 15 (R15), there will be an offset voltage formed as the following equations:

$$I_M = \frac{V_{IN} - V_{CC}}{R_{40}} \times \alpha \quad (5)$$

In Equation (5), IM is the mirror current that flows through the MOSFET 12; R40 is the resistance of resistor 40; and α is the mirror ratio of MOSFET 11 and 12. In the equation (6), Voffset is the voltage across the resistor 15. The offset voltage Voffset is connected to the negative input terminal of the adder 20. The positive input terminal of the adder 20 is connected to the reference voltage 25, which is 1V for instance. The adder 20 will output a voltage Vlimit, which determines the maximum current-sense voltage for output power limit. The adder 20 will do the arithmetic operation as the following equations show.

$$V_{limit} = V_{25} - \left(\frac{V_{IN} - V_{CC}}{R_{40}} \times \alpha \times R_{15}\right) \quad (7)$$

Vlimit is the maximum current-sense voltage, V25 is the voltage of the reference voltage 25, and IM is the mirror current that flows through the MOSFET 12 and resistor 15. The resistor 230, which is connected to the source of the power MOSFET 300, plays the role of I-to-V transformation. As the current IL, which flows through the power MOSFET 300 increases, the voltage VS in the resistor 230 will also rise up.

The first comparator 30 will compare the voltage VS and the voltage Vlimit. When the Vs is greater than Vlimit, the first comparator 30 will output a logic low signal to the input of a NAND gate 33. Thus, the NAND gate 33 will output a logic high signal to reset the flip-flop to turn off the power MOSFET 300. Therefore, the output power limit is achieved.

It is to be understood that if the value of the resistor 15 is a constant, from the equation (7), the Voffset voltage will become a function of the input line voltage VIN. The variation of the maximum current-sense voltage Vlimit is inversely proportion to the deviation of the input line voltage VIN. By properly selection, the input resistor can achieve an identical output power limit for the low line voltage and high line voltage input such as 90Vac and 264Vac.

Figure 3:
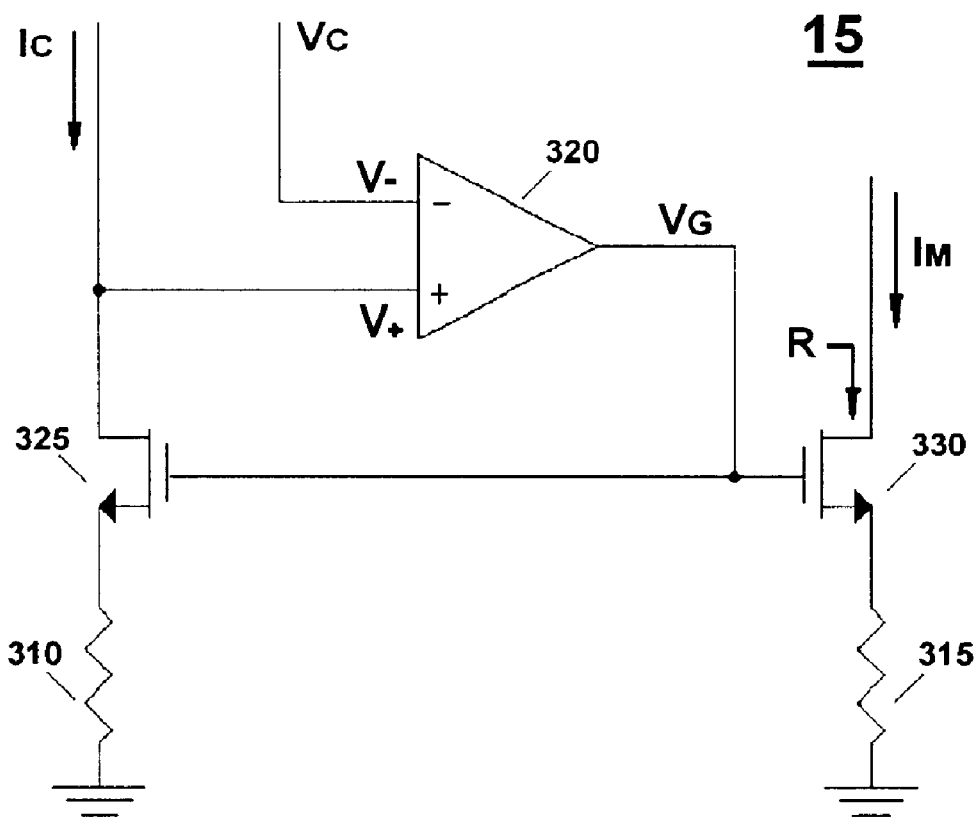
FIG. 3 displays a precise mirror-R circuit inside the integrated circuit.

However, there is a precondition to make Voffset a function of the input voltage, that is, the resistor 15 must be correlated with the resistor 40. Furthermore, it is difficult to design a precise resistor inside the integrated circuit. FIG. 3 illustrates how to mirror a precise resistor 15 in FIG. 2.

FIG. 3 displays the precise mirror-R embodiment. A constant current IC is connected to the drain of a MOSFET 325 and the positive input of an op amplifier 320. A constant voltage VC is connected to the negative input of the op amplifier 320. The output of the op amplifier 320 is connected to the gates of the MOSFET 325 and the MOSFET 330. A resistor 310 and a resistor 315 are connected between the ground and the sources of the MOSFET 325 and the MOSFET 330 respectively.

Both the MOSFET 325 and the MOSFET 330 operate in linear region. The characteristic of a MOSFET operated in linear region is a resistor. The equivalent resistor in linear region is more precise than that designed by W/L sheet resistance. The variation of resistor designed inside the integrated circuit is about ±30% by using W/L and sheet resistance. And it is easy to design a precise constant voltage and a precise constant current inside the integrated circuit. The following equations are the characteristics description of the MOSFET 330.

$$I = K \times \left[ (V_{GS} - V_T) \times V_{DS} - \left( \frac{1}{2} \times V_{DS}^2 \right) \right] \qquad (8)$$

In the above equation, $K=\delta(W/L)$, $\delta$ is the product of the mobility and oxide capacitance/unit. $V_T$ is the gate threshold voltage. $V_{GS}$ is the gate-to-source voltage. $V_{DS}$ is the drain-to-source voltage. From the equation (8), it is deduced that $$R_{DS} = \frac{V_{DS}}{I_{DS}} = \frac{1}{K \times \left[ (V_{GS} - V_T) - \left( \frac{1}{2} \times V_{DS} \right) \right]} \qquad (9)$$

In the linear region, $B_{GS}V_T > V_{DS}$. $R_{DS}$ is the equivalent drain-to-source resistance of a MOSFET. By assuming $V_{GS}V_T >> V_{DS}$ and introducing $K=\delta(W/L)$, the equation (9) will become:

$$R_{DS} = \frac{L}{[W \times \delta \times (V_{GS} - V_T)]} \qquad (10)$$

For example, when L/W=2.7, $V_{GS}$=4V, $V_T$=0.7V, and $\delta$=45uA/V², the resistor $R_{DS}$ is 18KΩ. Under the variance of production process, operational temperature, the deviation of $V_T$ and $\delta$ will be reduced by the gain of the op amplifier 320 illustrated in FIG. 3.

The MOSFET 330 is a resistor mirrored by the MOSFET 325. The operation current $I_{DS}$ of the MOSFET 325 equals to $I_C$, which is produced by a constant current. The voltage $V_G$ of the MOSFET 325 is equal to the negative input of the op amplifier 320. The loop of $V_+$ MOSFET 325$V_G$ op amplifier 320 constitutes a negative feedback. The loop will push the MOSFET 325 to operate in linear region. Thus, the MOSFET 325 plays the role of an equivalent resistor and the resistor value $R_{DS}$ will be $V_C/I_C$. The $V_{GS}$ of the MOSFET 330 equals to that of the MOSFET 325. The MOSFET 330 is the mirrored-R of the MOSFET 325.

The resistor 310 and the resistor 315 are applied to increase the linear region of the MOSFET 325 and the MOSFET 330.

It will be apparent to those skilled in the art that various modifications and variations can be made to the structure of the present invention without departing from the scope or spirit of the invention. In view of the foregoing, it is intended that, the present invention cover modifications and variations of this invention provided they fall within the scope of the following claims and their equivalents.

What is claimed is:

1. A PWM controller for controlling an output power limit of a power supply, comprising:

a current divider, having a first terminal connected to a line input voltage of the power supply via a startup resistor, a second terminal coupled to a supply voltage, and a third terminal;

a mirror resistor, having a first terminal coupled between the third terminal of the current divider, and a second terminal coupled to a ground voltage;

an adder, with a negative input terminal coupled between the third terminal of the current divider and the first terminal of the mirror resistor, a positive input terminal coupled to a reference voltage, and an output terminal;

a first comparator, with a positive input terminal coupled to the output terminal of the adder, a negative input terminal, and an output terminal;

a second comparator, with a positive input terminal coupled to the supply voltage, a negative terminal coupled to the negative terminal of the first comparator, and an output terminal;

a NAND gate, with two input terminals coupled to the output terminals of the first and second comparators, and an output terminal;

a flip flop, coupled to the output terminal of the NAND gate; and an oscillator, coupled to the flip flop.

2. A PWM controller as claimed in claim 1, wherein said current divider comprising:

a right MOSFET, having a source terminal connected to the line input voltage of the power supply via the startup resistor, a drain terminal and a gate terminal coupled to the supply voltage;

a left MOSFET, having a gate terminal connected to the gate terminal of the right MOSFET, a source terminal connected to the source terminal of the right MOSFET, and a drain terminal coupled between the negative input terminal of the adder and the first terminal of the mirror resistor.

3. A PWM controller as claimed in claim 1, wherein said mirror-R comprising: an op amplifier, having a positive input terminal, a negative input terminal and an output terminal, which provides a gain for a negative feedback loop;

a first MOSFET, having a drain terminal connected to the positive input terminal of the op amplifier, a gate terminal connected to the output terminal of the op amplifier to form said negative feedback loop, and a source terminal;

a constant voltage, connected to the negative input terminal of the op amplifier;

a constant current, flowing into the drain terminal of the first MOSFET;

a second MOSFET, which is geometrically identical to said first MOSFET, having a gate terminal coupled between the gate terminal of the first MOSFET and the output terminal of the op amplifier, a drain terminal that is the first terminal of the mirror-R, and a source terminal;

a first resistor connected between the source terminal of the first MOSFET and the ground voltage;

a second resistor connected between the source terminal of the second MOSFET and the ground voltage; in which the first resistor and the second resistor are applied to achieve extensive linear region for the first MOSFET and the second MOSFET.

* * * * *